US007013334B2

(12) United States Patent
Toyoshima et al.

(10) Patent No.: US 7,013,334 B2
(45) Date of Patent: Mar. 14, 2006

(54) NETWORK SYSTEM, DEVICE MANAGEMENT SYSTEM, DEVICE MANAGEMENT METHOD, DATA PROCESSING METHOD, STORAGE MEDIUM, AND INTERNET SERVICE PROVISION METHOD

(75) Inventors: Hirobumi Toyoshima, Machida (JP); Tadato Tanaka, Fujisawa (JP); Yuhji Yamashita, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 09/899,636

(22) Filed: Jul. 5, 2001

(65) Prior Publication Data
US 2002/0029263 A1    Mar. 7, 2002

(30) Foreign Application Priority Data
Jul. 7, 2000    (JP)    ............................. 2000-207587

(51) Int. Cl.
G06F 15/16    (2006.01)
(52) U.S. Cl. ...................................................... 709/223
(58) Field of Classification Search ........ 709/223–227; 707/3–4, 9–10, 100, 103; 713/201, 202
See application file for complete search history.

(56) References Cited

U.S. PATENT DOCUMENTS
6,662,222 B1 *   12/2003   Ishii et al. .................. 709/224

FOREIGN PATENT DOCUMENTS
JP    11-074883    *   3/1999

* cited by examiner

Primary Examiner—Andrew Caldwell
Assistant Examiner—Hieu Le
(74) Attorney, Agent, or Firm—Douglas W. Cameron; Anne Vachon Dougherty (57) ABSTRACT

A network system comprising general management consoles 9, which are connected to the Internet 8; a supervisor management console 4, which can be accessed by a device management server 2; a database 5, which is connected to the device management server 2, wherein company data, correlated with each general management console 9, and device data, for each device 10 correlated with the company data, are stored; a console manager 3, for relaying the data processing; and means for referring to the company data and the device data to permit the correlated general management console to provide a correlated service or device or group. Since only a management console is installed in a company, the company is relieved of its responsibility for providing for the complicated operation of a management server. Furthermore, since the fee that an ISP may charge for providing a device management service for multiple companies can be split among the relevant companies, the expense incurred by each company can be reduced.

22 Claims, 9 Drawing Sheets

NETWORK SYSTEM, DEVICE MANAGEMENT SYSTEM, DEVICE MANAGEMENT METHOD, DATA PROCESSING METHOD, STORAGE MEDIUM, AND INTERNET SERVICE PROVISION METHOD

FIELD OF THE INVENTION

The present invention relates to a computer network system and to a method for providing a service using a computer network. More specifically, the present invention pertains to a technique that can be effectively used for a system supporting a general management operation, which sorts into specific groups devices connected to an external network and which manages the devices that belong to these groups.

BACKGROUND OF THE INVENTION

Internet marketing has grown and its development has continued until today net sources offer a great variety of goods and services. But not all goods are eagerly sought after; Internet end users (consumers) tend to demand goods having higher added values. In addition, many such consumers, or users, are not intimately familiar with the operation of personal computers; their ranks include a considerable number of so-called beginners for whom the installation of application software, or the need to perform the detailed setup of an operating system for a personal computer, constitutes a large and unwanted load. Furthermore, a need exists for means to distinguish between competing companies that provide goods or services via the Internet, and to thus identify sources whose goods or services differ or that provide more attractive or additional services, and to obtain more computer users (enlarge the customer base).

A system that includes devices connected to a LAN can manage these devices using a system management tool. The system management tool makes possible the installation of application software and the setting of details for the device, and for a conventional system management tool, it is premised that a device will be connected using a LAN, and that a management console for managing the device will be connected to the same network as a management server, as an in-house network. Furthermore, since the operation of the system is supposed to be limited to a single company, the system does not include a function that enables each one of multiple management consoles to administer and control the access of a managed device. A general setup is established for a management console for the management of all the devices. And in addition, since the management console is supposed to be connected via a LAN, the level of the security provided by the management console and the server can be ascertained only by employing a user verification that includes a user ID and a password.

However, when a company employs the Internet to provide for a consumer, or a user, a service having a higher added value, according to the conventional technique, the company must construct therein a device management console and a device management server before establishing a connection to the Internet. Since companies, especially middle sized and small companies, must themselves perform the initial construction of management systems and the operation of management servers, increases in the loads imposed on them constitutes a critical problem.

On the other hand, if a company desires to borrow part of a conventional network and to entrust an agent with the operation of the system, conventionally, a function for managing the accessing of a managed device is not provided for each of a number of multiple management consoles, and thus, they can not respond to the needs of a company that manages a specific device group. Furthermore, since the management console is supposed to be connected to a LAN, the security between the management console and the management server can be ascertained only through user verification, for which a user ID and a password are employed, and therefore, while taking security into account, the connection of a management console to a server via an external network is not a preferable arrangement.

It is, therefore, a first object of the present invention to enable a system configuration, wherein only a management console is installed in a company, so that it is not necessary for companies to perform the complicated operations that can be provided by a management server. For example, when a device management server is installed at a specific ISP (Internet Service Provider), the ISP can provide a charge based device management service for multiple companies, and individual company expenses can be reduced.

It is a second object of the present invention to provide a technique whereby multiple companies can share the same device management server and the same database server, and can distribute software to or provide device settings or other services for only those devices that are managed by the respective companies. In short, relative to devices, the access management of multiple consoles is supported. And more specifically, this function inhibits the setting of devices managed by other companies.

It is a third object of the present invention to enforce security between a management console and a management server and to employ the management console via an external network.

SUMMARY OF THE INVENTION

An overview of the present invention will now be presented. According to the present invention, a network system for using a device management server to manage devices connected to a computer network, comprises: general management consoles connected to the computer network; a supervisor management console accessible by the device management server; a database, connected to the device management server, that includes enterprise data associated with each of the general management consoles and the device data associated with the enterprise data for each of the devices; a console manager for the intermediate transfer of data between the general management consoles or the supervisor management console and the database; and means for referring to the enterprise data and the device data to permit the general management consoles to offer a service for the devices, or an associated group thereof.

A profile data associated with the service is included in the database, and the console manager includes means for permitting the general management consoles to access the profile data.

Further, job data associated with the profile data is included in the database, and the network system further comprises means, when the devices are connected to the device management server, for searching for data and for requesting services associated with the device data available at the devices.

In addition, management data associated with each of the general management consoles is included in the database, and the network system further comprises means for, when the general management console logs in the device management server, examining an administrator using the enterprise data and the management data.

The supervisor management console is permitted to access, register, change or delete device data associated with all the devices, enterprise data, management data, profile data or job data.

BRIEF DESCRIPTION OF THE DRAWINGS

The invention will now be described in greater detail with specific reference to the appended drawings wherein.

DETAILED DESCRIPTION OF THE INVENTION

The preferred embodiment of the present invention will now be described in detail while referring to the drawings. It should be noted, however, that the present invention should not be interpreted only in line with the description given in this embodiment. Note further that the same reference numerals are used throughout the embodiment to denote corresponding or identical components.

In this embodiment, a method or a system will be explained; however, as will be obvious to one having ordinary skill in the art, the present invention can be implemented not only as a system but also as a storage medium for storing computer-readable program code. Therefore, this invention can be employed as a hardware or a software application, or as a combination of the two. An example storage medium that is provided for the storage of program code can be any computer-readable medium, such as a hard disk, a CD-ROM, or an optical or a magnetic storage device.

An ordinary computer system that can be employed as a server, such as a system management server, or as a user device comprises: a central processing unit (CPU), a main memory (RAM) and a nonvolatile memory (ROM), all of which are interconnected by a bus. In addition, a coprocessor, an image accelerator, a cache memory and an input/output controller (I/O) can also be directly connected to the bus, while an external storage device, a data input device, a display device and a communication controller, hardware resources with which a computer system is generally equipped, can be connected via appropriate interfaces. An example external storage device is a hard disk, although a magneto-optical storage device, an optical device or a semiconductor storage device, such as a flash memory, can also be used, and even a read-only memory medium, such as a CD-ROM, can be considered to be an external storage device when employed for the reading of data or of programs. The data input device is a keyboard or a pointing device, such as a mouse, or it may be a voice input device or an image reader, such as a scanner. And the display device is a CRT, a liquid crystal display device, or a plasma display device. As computer systems, a variety of types of computers can be used, including personal computers, workstations and main frames that are connected to a LAN or to the Internet, or to another network type. A communication line used for such a connection may be either a special line or a public network line. A radio network may also be employed.

The servers, the consoles or the devices need not be implemented by a single system, and may be distributed among a plurality of systems. That is, one part of a program can be processed by the computer of a user and the other part of the program can be processed by a remote computer. Further, it does not matter in which computer the data used for a program is stored. That is, so long as information concerning the location of data (an address) is available and the data can be used, on a computer network, the location at which data or a program is stored can be arbitrarily determined. A well known communication technique can be applied for communication between the network computers, and a standard protocol, such as TCP/IP or HTTP, can be employed. The location (address) of each file (data or program) stored in each storage device can be specified by using a DNS or a URL. It should be noted that the term "Internet" in this specification includes the Intranet and the Extranet. Internet access includes Intranet or Extranet access.

1. System Configuration

Figure 1:
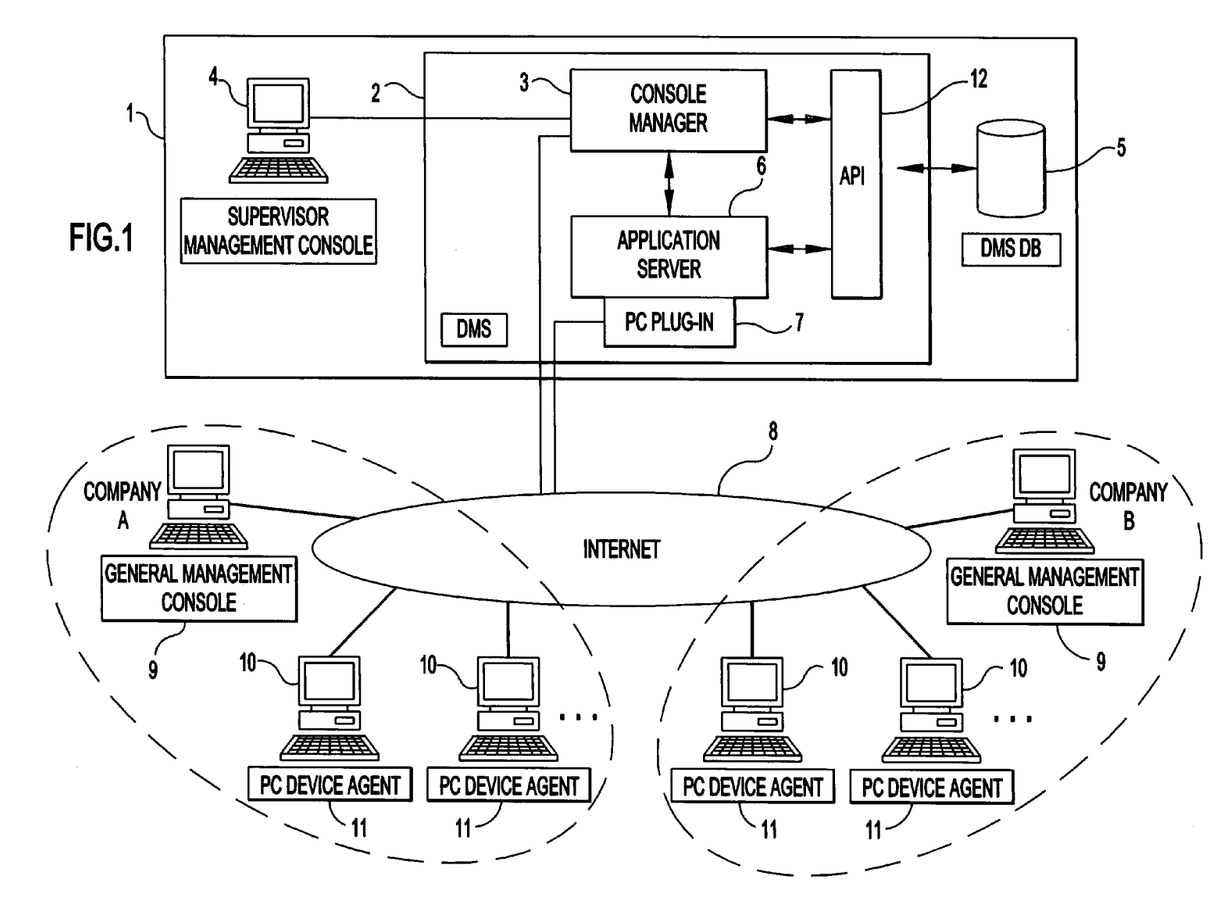
FIG. 1 is a diagram illustrating an overview of a network system according to one embodiment of the present invention.
Figure 2:
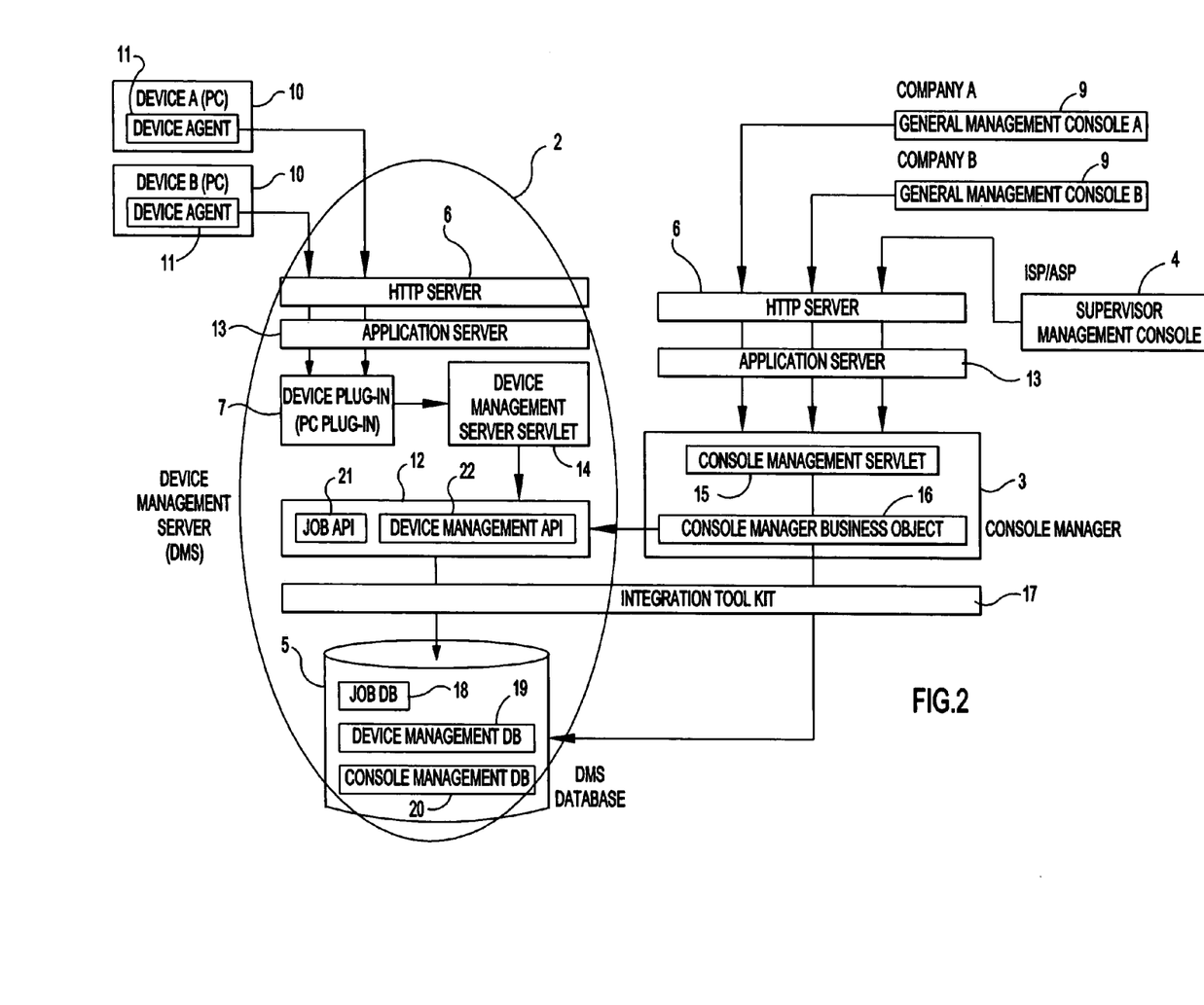
FIG. 2 is a detailed functional diagram showing the system according to the embodiment.

FIG. 1 is a diagram showing an overview of the network system according to this embodiment, and FIG. 2 is a detailed functional diagram used for explaining the system. The network system of this embodiment comprises: an ISP (Internet Service Provider) 1 installed device management server 2, a console manager 3, a supervisor management console 4, a DMS (Device Management Server) database 5, an application server 6, a PC (Personal Computer) plug-in 7, an external network 8 that connects together general management consoles 9 installed at companies, and client devices 10, for which a device management service is provided, in which device agents 11 are installed.

The ISP 1 is the enterprise that, in accordance with the embodiment, provides a device management service. The device management server 2 includes the HTTP server 6 for verification processing, an application server 13 for web control, the PC plug-in 7, a device management servlet 14, an API 12, the console manager 3, and an integration tool kit 17.

The console manager 3 accepts requests from the supervisor management console 4 and the general management consoles 9, which are distributed among the individual companies, and, while controlling access, relays requested operations for transmission to the database 5.

The supervisor management console 4, installed in the ISP 1, performs management processes, such as the registering of the general management consoles 9, and manages an enterprise ID and an administrator ID that are allocated for each company. The supervisor management console 4 also provides management control for each device 10.

The database 5 includes a console management database 20, required for the management of the general management consoles 9, a device management database 19, required for the management of the devices 10, and a job database 18, required for job management. The database 5 is operated via the API 12, which includes a job API 21 and a device management API 22.

The general management consoles 9, which are installed at companies, are used by company administrators to provide device management for the client devices 10 that are installed at their companies.

The console manager 3, which is the servlet 15 on the HTTP server, accepts HTTP requests from the management consoles 4 and 9, and returns processing results as HTTP responses. SSL client verification is required for communication between the management consoles 4 and 9 and the console manager 3, and the processing on the client side is performed by an SSL library stored in the console. The SSL process on the server 4 side is performed, for example, by the application server 6. The console manager 3 includes a table group (console management database) that is added to the DMS database 5 and a module (console manager business object 16) for accessing the table group.

In the network system for this invention, after a device has been verified by the SSL, administrator verification is performed when the consoles 4 and 9 are logged in. The administrator verification function is a function whereby an examination is performed to determine whether a user of the console 4 or 9 is an authorized administrator, and if a request is submitted by an unauthorized administrator the console manager 3 will reject it. The entries that must be input for verification are, for example, an administrator ID, an administrator password and an enterprise ID. It should be noted that the enterprise ID is automatically read from an ID file that is distributed to each company.

The administrator verification process is performed by examining the ENTERPRISE table and the ADMINISTRATOR table in the database 5, and when an administrator has been verified, the console manager 3 stores the enterprise ID and the administrator ID in correlation with the session, and notifies the consoles 4 and 9 that the process was successful. Thereafter, the legality of the request issued by a console can be determined by examining the IDs that are correlated with the session, and the database resource access can be controlled. This right of access is separately provided for each enterprise, and a successful verification is valid throughout the session for which the process was performed. When, however, the verification process is unsuccessful, or if a request has been issued by an unauthorized person, the console manager 3 terminates the session and severs the communication connection. Administrative control of a session can be exercised by issuing a verification ticket with an expiration time to the management consoles 4 and 9 when they are logged on, and by thereafter using the verification ticket as the session ID.

The services registered in the database 5 are distributed to the devices 10. For this distribution, a pull type service is provided when the device 10 is connected to the DMS 2 of the ISP 1. That is, the device 10 can search the job management database that is correlated with this device, and can download, and thus receive, the service that is registered for it. In this case, the service is downloaded through the PC plug-in 7 and the PC device agent 11.

With this system configuration, a company can provide a device service for a device it administers without having to prepare a company specific system. Further, the company can employ the general management console to provide not only a service prepared by the system but also a unique service for the device that it administers. And a system provider (an enterpriser) can increase the use of the system not only by common device users but also by companies, and can, through the companies, obtain more device users. Thus, the system of the invention can benefit device users by providing them additional services.

2. Database Configuration

Figure 3:
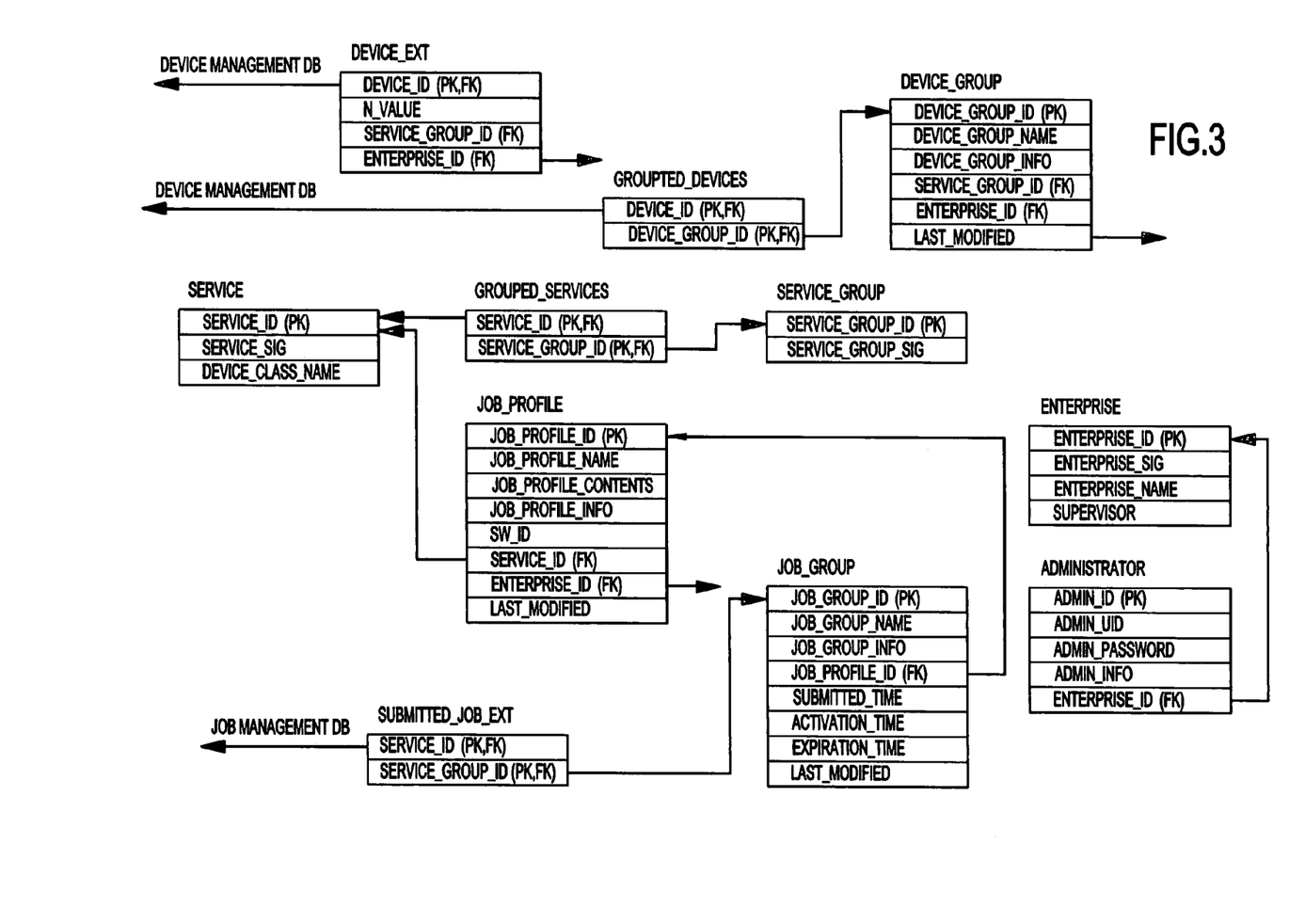
FIG. 3 is a diagram showing a console manager database structure.

The structure of the console manager database 20 of this system will now be described. The console manager 3 and its database 20 are so designed that they can control the supervisor management console 4 and the general management console 9. The companies and the administrators, including an enterpriser and a supervisor administrator, are managed by the database 20. When the administrator of a company desires to issue a request to the console manager 3, his or her status must be verified at log-on time. Thus, since not only the device management but also the administrator verification is performed, the system security can be improved.

After being verified, an administrator can proceed to perform his or her job, while the console manager 3 controls system accesses so that the administrator can not access the resources of another company. It should be noted that this limitation does not apply to a supervisor administrator.

Figure 4:
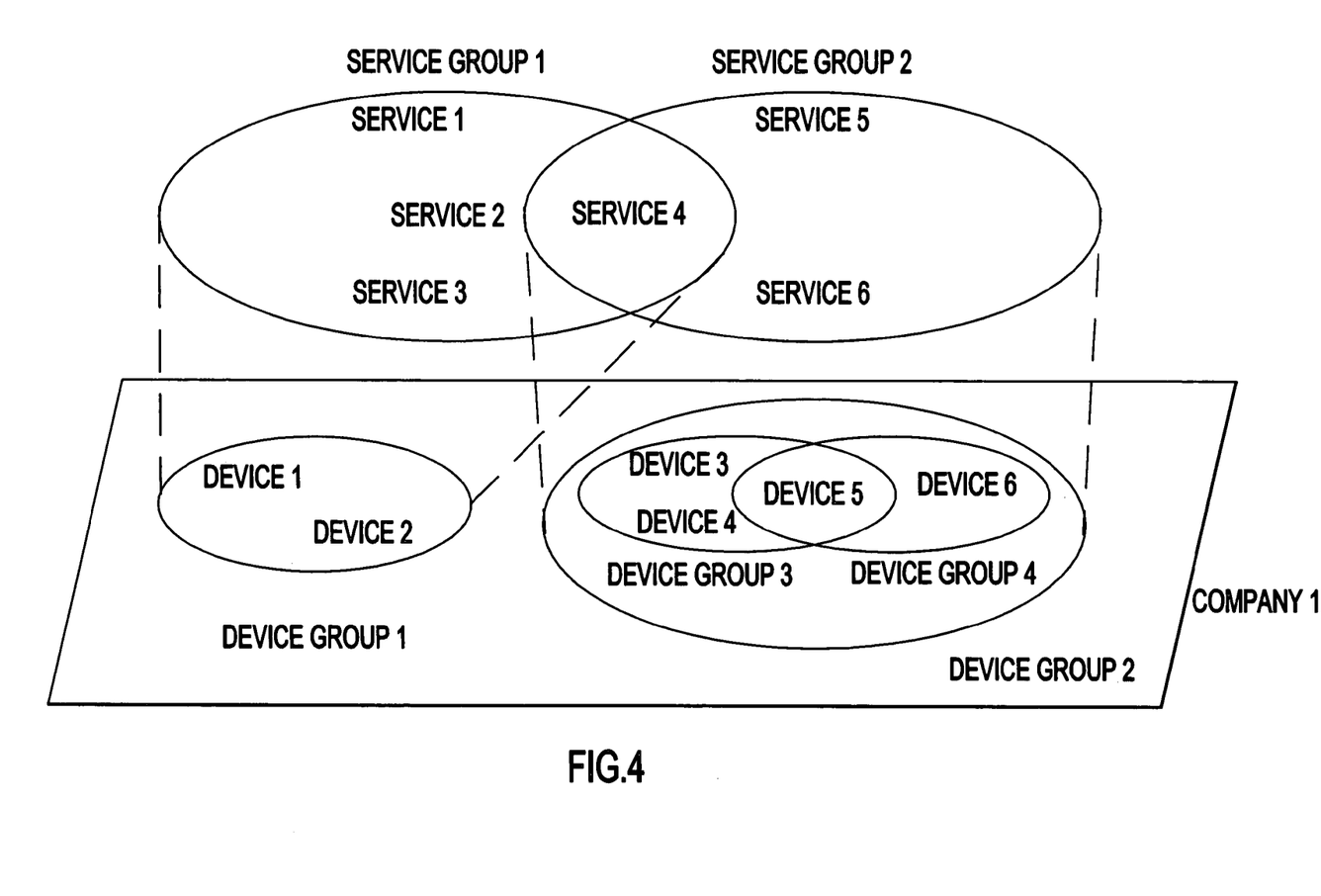
FIG. 4 is a diagram showing the relationship between device groups and service groups.

The console manager database 20 for this system will now be explained. FIG. 3 is a diagram showing the structure of the console manager database 20. In this system, the devices 10 of users can be sorted into groups, corresponding to their respective companies, in accordance with the services that they can receive. That is, a device 10 that is controlled by a company may belong to a service group in that company. Thus, devices 10 can be formed into groups so long as they are managed by the same company and receive the same services, and each device can belong to multiple device groups within the company. This relationship concept is shown in FIG. 4, in which the relationships existing between devices and service groups are represented.

A service group consists of available services. After a device has been registered, thenceforth the device belongs to a specific service group, which means that the device is capable of receiving the services allocated for that service group. That is, the service group indirectly represents a set of devices that can provide predetermined services. Service groups are set up by a supervisor administrator, and a specific service group can be set up for multiple companies at the same time, so long as the limitations imposed by company boundaries are observed. The database 20 is so designed that it can be used to manage the above described groups.

The job of the device management server (DMS) of this invention is performed for each device. Therefore, the jobs must be formed into groups in order to support the jobs for the device groups. The database 20 manages the job groups.

A job profile prepared by the administrator of a company is managed by the database 20. The concept of the service is finally mapped into the concept of the DMS, which is the job. The contents of the jobs are then written in the job profile, and are correlated with the respective services.

The table arrangement of the console manager database 20 will now be described. While taking into account the affinity of the device management server (DMS), the tables are designed to supplement the standard table structure of the device management server. "Device Management DB" and "Job Management DB" in FIG. 3 are databases managed by the device management server. The details for the tables in the database 20 are as follows.

2-1. ENTERPRISE Table

An ENTERPRISE table holds the list of companies. Table 1 is an example ENTERPRISE table. The details for fields are as follows.

TABLE 1

| Name | Type | Size | Required | Example |
|---|---|---|---|---|
| ENTERPRISE_ID(PK) | integer | — | Y | 1000 |
| ENTERPRISE_SIG | varchar | 64 | Y | "J0001" |
| ENTERPRISE_NAME | varchar | 255 | Y | "ABC, Japan, Ltd." |
| SUPERVISOR | char | 1 | Y | 'Y' |

ENTERPRISE_ID is an in-house ID number corresponding to each company, and is used mainly for the internal database process. When the supervisor administrator prepares and registers a company entry, a unique ENTERPRISE_ID is automatically generated for the ENTERPRISE table.

ENTERPRISE_SIG is a unique identification name for a company in the ENTERPRISE table. The ENTERPRISE_SIG is allocated for each company by the supervisor administrator.

ENTERPRISE_NAME is the unique name of a company in the ENTERPRISE table.

SUPERVISOR represents a company that is an enterpriser. Character "Y" represents an enterpriser, and the other character represents an entire company. An enterprise can not include multiple companies.

2-2. ADMINISTRATOR Table

An ADMINISTRATOR table holds the list of administrators. Table 2 is an example ADMINISTRATOR table. The details for the fields are as follows.

TABLE 2

| Name | Type | Size | Required | Example |
|---|---|---|---|---|
| ADMIN_ID(PK) | integer | — | Y | 1000 |
| ADMIN_UID | varchar | 64 | Y | "ichiro" |
| ADMIN_PASSWORD | varchar | 255 | Y | (binary) |
| ADMIN_INFO | varchar | 512 | N | "Tokkyo Ichiro Tel/Fax: 045-123-4567" |
| ENTERPRISE_ID(FK) | integer | — | Y | 1000 |

ADMIN_ID is an in-house ID number corresponding to each administrator, and is used mainly for the internal database process. When a supervisor administrator prepares and registers an administrator entry, a unique ADMIN_ID is automatically generated for the ADMINISTRATOR table.

ADMIN_UID is the unique identification name of an administrator that is entered in the ADMINISTRATOR table.

ADMIN_PASSWORD is the password for an administrator. A unit that is not in plain text is obtained, for example, by performing a uni-directional hash function and is stored.

ADMIN_INFO is information for an administrator.

ENTERPRISE_ID represents a company to which an administrator belongs, and indicates an ENTERPRISE_ID that is entered in the ENTERPRISE table. When a member company is an enterprise, the administrator serves as a supervisor administrator.

2-3. SERVICE Table

A SERVICE table holds the list of services. Table 3 is an example of the SERVICE table. The details for the fields are as follows.

TABLE 3

| Name | Type | Size | Required | Example |
|---|---|---|---|---|
| SERVICE_ID(PK) | integer | — | Y | 1000 |
| SERVICE_SIG | varchar | 64 | Y | "INTERNET_BUTTON_SETTING" |
| DEVICE_CLASS_NAME | varchar | 256 | Y | "PC Type 1" |

SERVICE_ID: is an in-house ID number corresponding to each service, and is used mainly for the internal database process. When a supervisor administrator prepares and registers a service entry, a unique SERVICE_ID is automatically generated for the SERVICE table.

SERVICE_SIG is the identification name for a service. A pair consisting of a unique SERVICE_SIG and a unique DEVICE_CLASS_NAME is entered in the SERVICE table.

DEVICE_CLASS_NAME is the name of a device class. The device class is one part of the PC plug-in, and handles communications with a device.

2-4. SERVICE_GROUP Table

A SERVICE_GROUP table holds the list of service groups. Table 4 is an example SERVICE_GROUP TABLE. The details for the fields are as follows.

TABLE 4

| Name | Type | Size | Required | Example |
|---|---|---|---|---|
| SERVICE_GROUP_ID(PK) | integer | — | Y | 1000 |
| SERVICE_GROUP_SIG | varchar | 64 | Y | "SERVICE_GROUP_1" |

SERVICE_GROUP_ID is an in-house ID number corresponding to each service group, and is used mainly for the internal database process. A unique SERVICE_GROUP_ID is automatically generated for the SERVICE_GROUP table when the supervisor administrator prepares and registers a service group.

SERVICE_GROUP_SIG: This is the identification name of a service group, and must be a unique entry in the SERVICE_GROUP table.

2-5. GROUPED_SERVICES Table

A GROUPED_SERVICES table is used to correlate a service and a service group. Table 5 is an example GROUPED_SERVICES table.

TABLE 5

| Name | Type | Size | Required | Example |
|---|---|---|---|---|
| SERVICE_ID(FK) | integer | — | Y | 1000 |
| SERVICE_GROUP_TD(FK) | integer | — | Y | 1000 |

SERVICE_ID indicates the SERVICE_ID in the SERVICE table. A pair consisting of a unique SERVICE_ID and a unique SERVICE_GROUP_ID is entered in the GROUPED_SERVICES table.

SERVICE_GROUP_ID indicates the SERVICE_GROUP_ID in the SERVICE_GROUP table.

2-6. JOB_PROFILE Table

A JOB_PROFILE table holds a list of job profiles. Table 6 is an example JOB_PROFILE table.

TABLE 6

| Name | Type | Size | Required | Example |
|---|---|---|---|---|
| JOB_PROFILE_ID(PK) | integer | — | Y | 1000 |
| JOB_PROFILE_NAME | varchar | 255 | Y | "distribute cherry-blossom storm icon" |
| JOB_PROFILE_CONTENTS | varchar | 1024 | Y | "file:///jobres/J001/1000/Cherrydist.pkg" |
| JOB_PROFILE_INFO | varchar | 512 | N | " . . . in order to distribute spring icon" |
| SW_ID | long | — | N | 1000000 |
| SERVICE_ID(FK) | integer | — | Y | 1000 |
| ENTERPRISE_ID(FK) | integer | — | Y | 1000 |
| LAST_MODIFIED | date | — | Y | (date and time) |

JOB_PROFILE_ID is an in-house ID number corresponding to each job profile, and is used mainly for the internal database process. A unique JOB_PROFILE_ID is automatically generated for the JOB_PROFILE table when the entry of a job profile is prepared and registered.

JOB_PROFILE NAME is the name of a job profile. A pair consisting of a unique JOB_PROFILE_NAME and a unique ENTERPRISE_ID is entered in the JOB_PROFILE table.

JOB_PROFILE_CONTENTS are the contents of a job profile. For example, the URL for a package file used for a job is stored here.

JOB_PROFILE_INFO is information concerning a job profile, and is arbitrarily set in this field.

SW_ID indicates the SW_ID in the SOFTWARE table in the DMS.

SERVICE_ID indicates the SERVICE_ID in the SERVICE table.

ENTERPRISE_ID represents a company that has a job profile, and indicates the ENTERPRISE_ID that is entered in the ENTERPRISE table.

LAST_MODIFIED is the latest date on which a job profile was updated.

2-7. JOB_GROUP Table

A JOB_GROUP table holds a list for a job group. Table 7 shows an example JOB_GROUP table.

TABLE 7

| Name | Type | Size | Required | Example |
|---|---|---|---|---|
| JOB_GROUP_ID(PK) | long | — | Y | 1000 |
| JOB_GROUP_NAME | varchar | 255 | Y | "distribute icon to line for Mr. ochimizu" |
| JOB_GROUP_INFO | varchar | 512 | N | "Yamato 1st floor, Yamato 2nd floor" |
| JOB_PROFILE_ID(FK) | integer | — | Y | 1000 |
| SUBMITTED_TIME | date | — | Y | (date and time) |
| ACTIVATION_TIME | date | — | Y | (date and time) |
| EXPIRATION_TIME | date | — | Y | (date and time) |
| ENTERPRISE_ID(FK) | integer | — | Y | 1000 |
| LAST_MODIFIED | timestamp | — | Y | (date and time) |

JOB_GROUP_ID is an in-house ID number corresponding to a job group, and is used mainly for the internal database process. A unique JOB_GROUP_ID is automatically generated for the JOB_GROUP table when a supervisor administrator prepares and registers a job group entry.

JOB_GROUP NAME is the name of a job group. A pair consisting of a unique JOB_GROUP_NAME and a unique ENTERPRISE_ID is entered in the JOB_GROUP table.

JOB_GROUP_INFO is information for a job group, and information concerning, for example, an object for a job that is stored. The setting for the JOB_GROUP_INFO in this field is arbitrary.

JOB_PROFILE_ID represents the contents of a scheduled job, and indicates the JOB_PROFILE_ID that is stored in the JOB_PROFILE table.

SUBMITTED_TIME is the date and time at which a job was registered.

ACTIVATION_TIME is the date and time at which a job is executed.

EXPIRATION_TIME is the date and time at which a job will expired.

ENTERPRISE_ID represents a company to which a job group belongs, and indicates the ENTERPRISE_ID that is stored in the ENTERPRISE table.

LAST_MODIFIED is the latest date on which a job group was updated.

2-8. SUBMITTED_JOB_EXT Table

A SUBMITTED_JOB_EXT table is used to correlate a job and a job group. Table 8 is an example SUBMITTED_JOB_EXT table.

TABLE 8

| Name | Type | Size | Required | Example |
|---|---|---|---|---|
| JOB_ID(PK,FK) | integer | — | Y | 1000 |
| JOB_GROUP_TD(FK) | integer | — | Y | 1000 |

JOB_ID indicates the JOB_ID in the SUBMITTED_JOBS table in the DMS. A pair consisting of a unique JOB_ID and a unique JOB_GROUP_ID is stored in the GROUPED_JOBS table.

JOB_GROUP_ID indicates the JOB_GROUP_ID in the JOB_GROUP table.

2-9. DEVICE_EXT Table

A DEVICE_EXT table holds supplemental information for the DEVICE table of the DMS. Table 9 is an example DEVICE_EXT table.

TABLE 9

| Name | Type | Size | Required | Example |
|---|---|---|---|---|
| DEVICE_ID(PK,FK) | long | — | Y | 1000 |
| N_VALUE | varchar | 32 | N | "123-4567" |
| SERVICE_GROUP_ID(FK) | integer | — | Y | 1000 |
| ENTERPRISE_ID(FK) | integer | — | Y | 1000 |

DEVICE_ID is a unique DEVICE_ID that is stored in the DEVICE_EXT table and represents the DEVICE table in the DMS. N_VALUE: This is a device management number managed by an enterpriser.

SERVICE_GROUP ID represents a service group to which a device group belongs, and indicates the SERVICE_GROUP_ID that is entered in the SERVICE_GROUP table.

ENTERPRISE_ID represents a company to which a device group belongs, and indicates the ENTERPRISE_ID that is entered in the ENTERPRISE table.

2-10. DEVICE_GROUP Table

A DEVICE_GROUP table holds a list of device groups. Table 10 is an example DEVICE_GROUP table.

TABLE 10

| Name | Type | Size | Required | Example |
|---|---|---|---|---|
| DEVICE_GROUP_ID(PK) | long | — | Y | 1000 |
| DEVICE_GROUP_NAME | varchar | 255 | Y | "SE7, 6th floor, Hall B, Y branch, ABC Ltd." |
| DEVICE_GROUP_INFO | varchar | 512 | N | ... shimotsuruma, Yamato-shi |
| SERVICE_GROUP_ID(FK) | integer | — | Y | 1000 |
| ENTERPRISE_ID(FK) | integer | — | Y | 1000 |
| LAST_MODIFIED | date | — | Y | (date and time) |

DEVICE_GROUP_ID is an in-house ID number corresponding to each device group, and is used mainly for the internal database process. A unique DEVICE_GROUP_ID is automatically generated in the DEVICE_GROUP table when a supervisor administrator prepares and registers a device group entry.

DEVICE_GROUP_NAME is the name of a device group. A pair consisting of a unique DEVICE_GROUP_NAME and a unique ENTERPRISE_ID is stored in the DEVICE_GROUP table.

DEVICE_GROUP_INFO is information for a device group. The setting for the DEVICE_GROUP_INFO in this field is arbitrary.

SERVICE_GROUP_ID represents a service group to which a device group belongs, and indicates the SERVICE_GROUP_ID that is stored in the SERVICE_GROUP table.

ENTERPRISE_ID represents a company to which a device group belongs, and indicates the ENTERPRISE_ID that is stored in the ENTERPRISE table.

LAST_MODIFIED is the latest date and time at which a device group was updated.

2-11. GROUPED_DEVICES Table

A GROUPED_DEVICES TABLE is used to correlate a device and a device group. Table 11 is an example GROUPED_DEVICES table.

TABLE 11

| Name | Type | Size | Required | Example |
|---|---|---|---|---|
| DEVICE_ID (FK) | long | — | Y | 1000 |
| DEVICE_GROUP_ID (FK) | long | — | Y | 1000 |

DEVICE_ID indicates the DEVICE_ID that is stored in the DEVICE table of the DMS. A pair consisting of a unique DEVICE_ID and a unique DEVICE_GROUP_ID is stored in the GROUPED_DEVICES table.

DEVICE_GROUP_ID indicates the DEVICE_GROUP_ID that is stored in the DEVICE_GROUP table.

The database, including the above tables, is prepared so that the system can be operated. Arbitrary elements are included in the elements in these tables, and are not requisite for the present invention. Further, other arbitrary elements can also be added.

3. System Function

Figure 5:
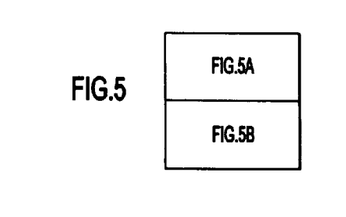
FIG. 5 is a diagram showing the processing performed when a supervisor management console issues a request to a device management server, and the server responds to this request.
Figure 5A:
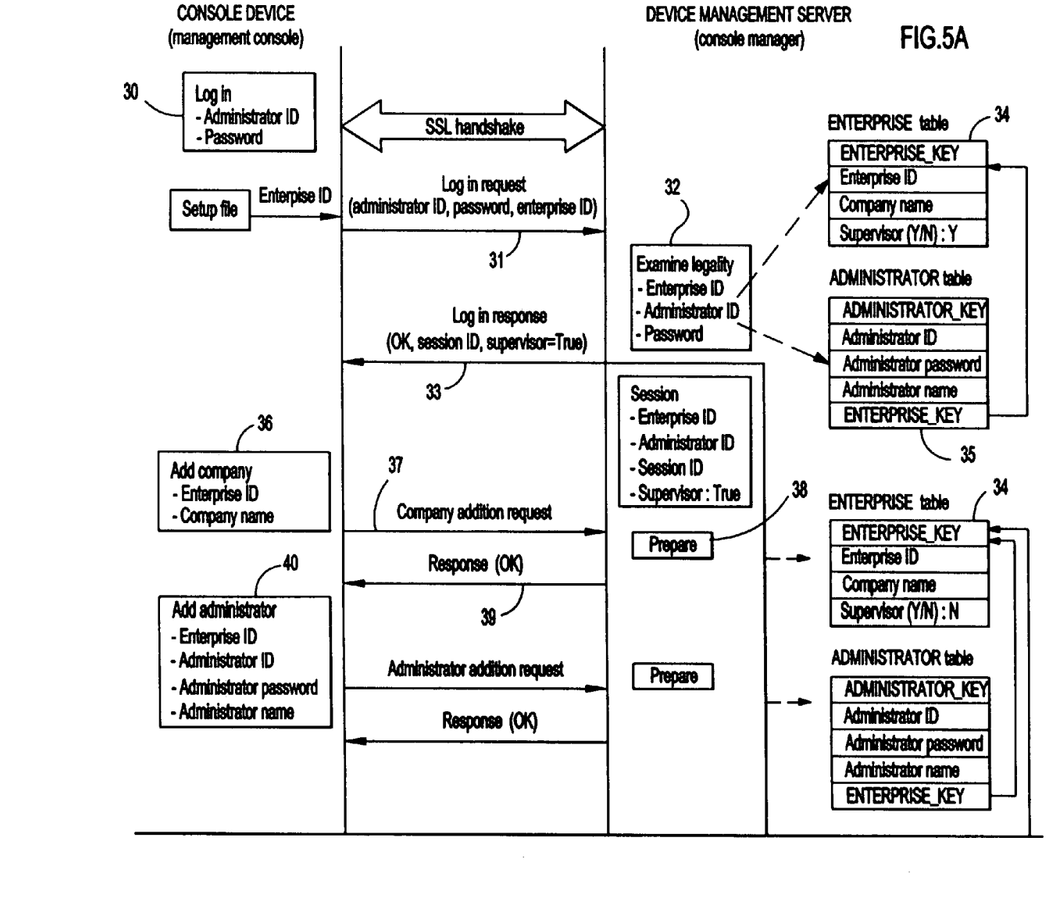
Figure 5B:
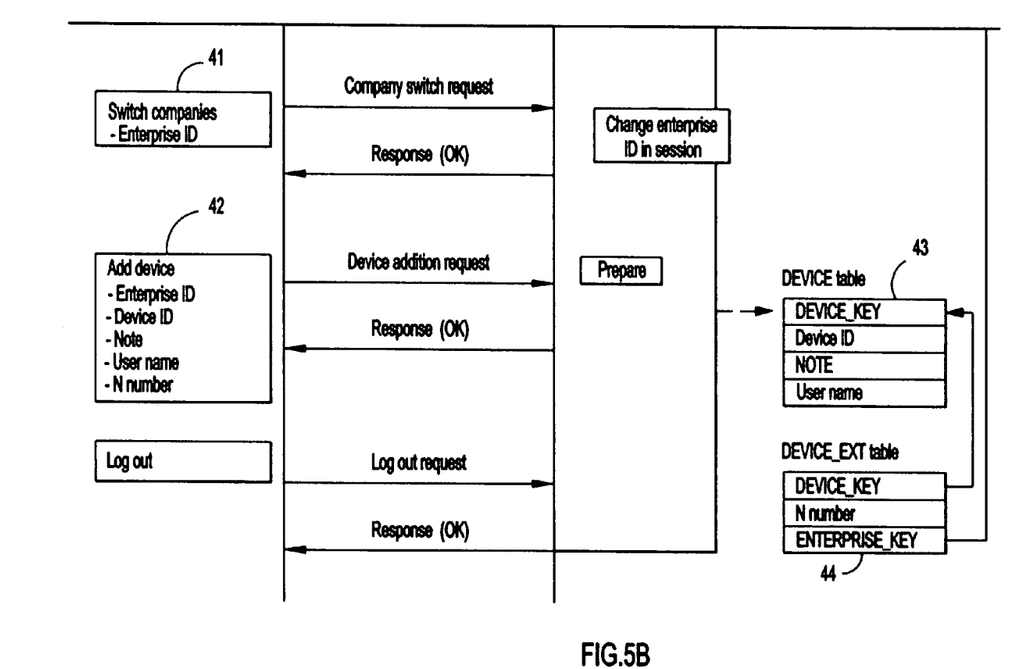
Figures 6, 6B:
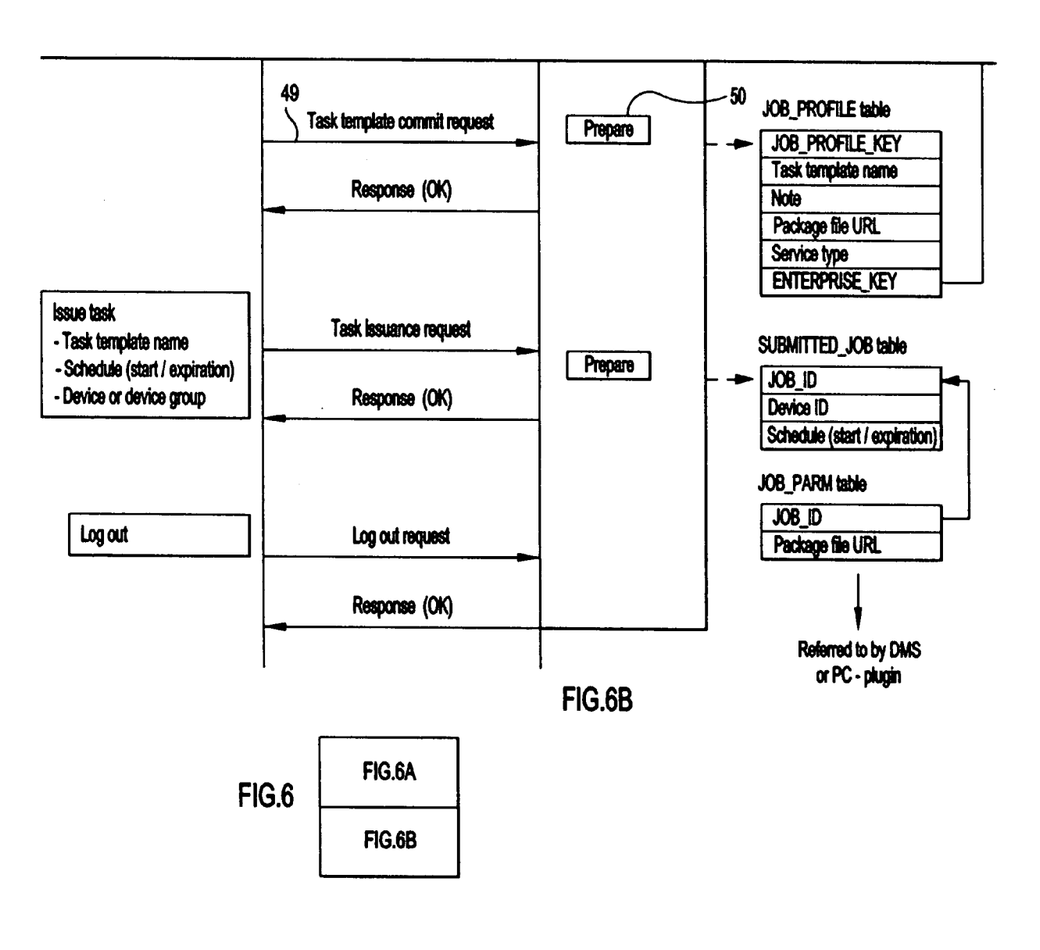
FIG. 6 is a diagram showing the processing performed when a general management console issues a request to a device management server, and the server responds to this request.
Figure 6A:
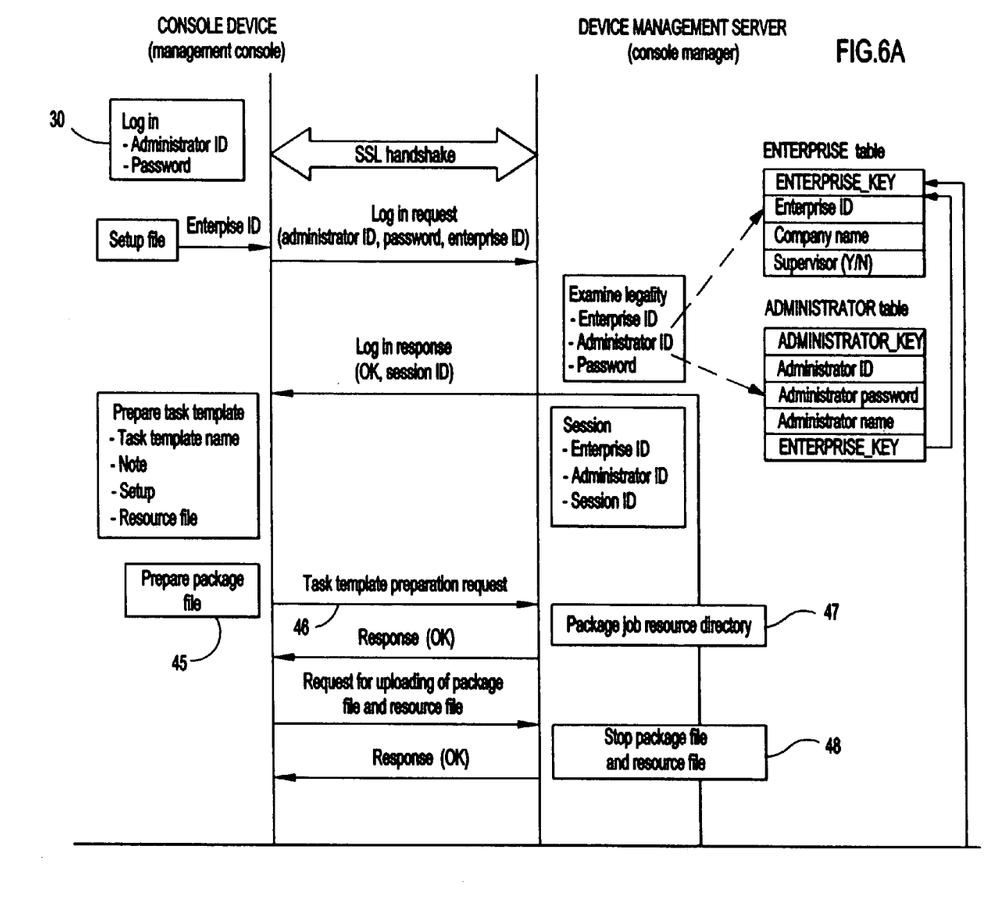
Figure 7:
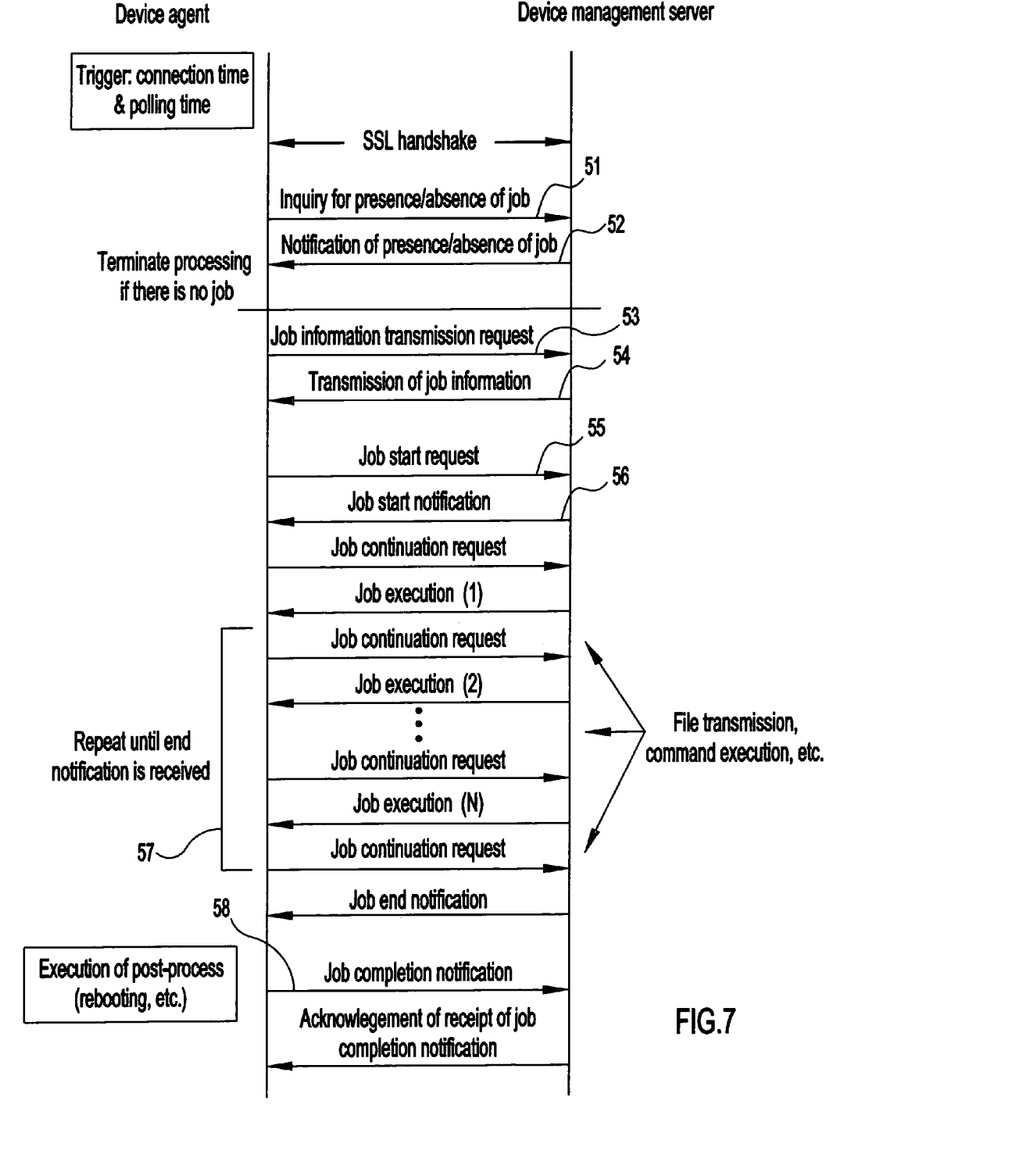
FIG. 7 is a diagram showing the processing performed when the device of an end user issues a request to a device management server, and the server responds to this request.

The functions carried out by the system will now be described. FIG. 5 is a diagram showing the processing performed when the supervisor management console issues a request to a device management server and the server responds to this request. The processing request from the console is shown on the left in FIG. 5, and the contents of the processing performed by the management server (console manager) are shown on the right. FIG. 6 is a diagram showing the processing performed when the general management console issues a request to the device management server and the server responds to this request. The processing request from the console is shown on the left in FIG. 6, and the contents of the processing performed by the management server (console manager) are shown on the right. FIG. 7 is a diagram showing the processing performed when the device of an end user issues a request to the device management server and the server responds to this request. The processing request from the device is shown on the left in FIG. 7, and the contents of the processing performed by the management server (device manager) are shown on the right.

When the functions of the system are implemented, the communication contents of the management console are roughly sorted into the following two types. The first type is a database search/update request (command) forwarded to the console manager, and the second type is the uploading of a file to be distributed to the devices. The first type can be issued as an XML command, while an HTML POST command can be used for the second type. Details, such as the format defined in an XML command and the contents and the uploading of a file using an HTML POST command, are well known to one having the ordinary skill in the art. Furthermore, functions such as data compression, compatibility with NLS, divided transmission (reception) for huge amounts of data and partial re-transmission, and the encryption of private information (an administrator password, etc.) for each company, can be additionally provided for communications that employ this system.

A detailed explanation will now be given for the processing performed by the consoles or the devices and the management server.

3-1. Administrator Verification

The administrator verification function is a function used to determine whether a person who is to use the supervisor management console or the general management console is an authorized administrator. The console manager will not accept a request from a non-authorized administrator, so when a log-in occurs at the supervisor management console 4 or the general management console 9 (step 30), the console 4 or 9 transmits, to the server 2 (console manager 3), the enterprise ID in a setup file along with the administrator ID and password that are input at the time of the log-in (step 31). This communication process is performed in a handshaking manner using SSL. The console manager 3 performs a legality examination (verification) (step 32), and transmits a log-in response (step 33).

The verification of the administrator is performed by examining an ENTERPRISE table 34 and an ADMINISTRATOR table 35 in the database. When the administrator has been verified, the console manager 3 stores the enterprise ID and the administrator ID in correlation with the session, and notifies the console 4 or 9 that the processing was completed successfully (step 33). Thereafter, for a request received from the console, legality can be determined by examining the ID that is correlated with the session. Thus, the resource access can be controlled. The access right is provided for each company, and the verification is valid during the same session. When the verification processing is not successful, or when the request has been issued by an unauthorized person, the console manager 3 terminates the session and severs the communication connection. To provide session management, a verification ticket with an expiration time is issued to the management console 4 or 9 at the time of the log-in, and thereafter the verification ticket is used as a session ID.

3-2. Management of a Company

Company management can be performed only by the supervisor management console (supervisor operation). The console manager 3 determines whether a supervisor flag is "true" in order to determine whether a request has been issued by the supervisor management console 4. The supervisor flag is transmitted to the console with the log-in response.

To add a company (step 36), the console manager receives a company addition request 37 from the console and makes an entry in the ENTERPRISE table 34 (step 38). The companies of the enterprisers are preset in advance when they are introduced, and an enterpriser can not be added. The identification names that are provided for the companies and that are distributed to the administrators of the companies must match those stored in the database. After completing the addition process, the console manager 3 transmits an OK response to the supervisor management console 4 (step 39).

To delete a company, an entry is deleted from the ENTERPRISE table. At this time, all associated entries, such as those for an administrator, a device group, a device, a job group, a job and a job profile, must also be deleted. It should be noted that the company of an enterpriser can not be deleted. To change the attribute of a company, an entry in the ENTERPRISE table is altered. It should be noted that a list of companies is compiled by referring to the ENTERPRISE table.

3-3. Management of Administrators

The management of administrators, as well as the management of companies, is a supervisor operation. It should be noted, however, a general administrator is permitted to perform one part of this operation. To add an administrator (step 40), an entry is added to the ADMINISTRATOR table. In the same manner as is described above, a request is transmitted to the server (console manager), and the server rewrites the database in accordance with the request. At least one supervisor administrator is preset in advance at the time of introduction. To remove an administrator, an entry in the ADMINISTRATOR table must be deleted. A deletion operation in which all of the supervisor administrators are deleted can not be performed. To change the attribute for an administrator, an entry in the ADMINISTRATOR table is altered. A supervisor administrator can change the administrator password and the administrator information for an arbitrary administrator, but a general administrator can change only his or her password. A list of administrators is compiled by referring to the ADMINISTRATOR table and the ENTERPRISE table.

3-4. Switching Companies

Upon the receipt of a request from the supervisor management console 4, the console manager 3 can switch companies by changing the enterprise ID (step 41).

3-5. Device Management

In principle, device management is supervisor management, but a general administrator is permitted to perform one part of the management process. The addition of a device (step 42) is a supervisor operation. To add a device, an entry is made in the DEVICE table (recorded in the device management database 19) in the DMS, and at the same time, a corresponding entry is made in the DEVICE_EXT table 44. The deletion of a device is also a supervisor operation. To delete a device, an entry is removed from the DEVICE table in the DMS, and at the same time, a corresponding entry is removed from the DEVICE_EXT table. To change the attribute of a device (supervisor operation), an entry in the DEVICE table or DEVICE_EXT table in the DMS is altered. A list of devices is compiled by referring to the DEVICE table, the DEVICE_EXT table and the GROUPED_DEVICES table in the DMS. All the devices belonging to a specific device group can be included in such a list. To group the devices, an entry is made in the GROUPED_DEVICES table. The devices to be grouped must belong to the same company and to the same service group. So when device groups are to be prepared, first, the devices in a company are listed and then they are sorted into groups.

The service group is a necessary concept when the grouping of devices is taken into account. The service group has two aspects. One aspect is that the service group represents the frame (base) of a service an enterpriser provides individual companies. For example, the enterpriser can set up a service group that includes a service 1 and a service 2, and the member companies can add their unique contents to the services 1 and 2. The other aspect is that, since the devices are correlated with the service groups, it is guaranteed that a specific device will be capable of receiving services included in the service group.

3-6. Management of Device Groups

To add a device group, an entry is made in the DEVICE_GROUP table. And to delete a device group, an entry is removed from the DEVICE_GROUP table, while at the same time, a corresponding entry is removed from the GROUPED_DEVICES table. To change the attribute of a device group, for which the only changeable attribute is the device group name, an entry in the DEVICE_GROUP table is altered. A list of device groups is compiled by referring to the DEVICE_GROUP table and the GROUPED_DEVICES table. All the device groups to which a specific device belongs, or all the devices that belong to a specific device group, can be compiled to form a list.

3-7. Job Management

For the consoles 4 and 9 and the console manager 3, the service is mapped into the concept "job" in the DMS. In the DMS, one job is prepared for one device. A job can be scheduled for each device or for each device group, and in either case, the scheduling for a job is performed at the device level, the overlapping of devices is eliminated, and a group of jobs for a device group is added as an entry in the JOB_GROUP table. Thereafter, the job for the device group is referred to by using the job group name. The SUBMITTED_JOB_EXT table provides the correlation of the SUBMITTED_JOB table in the DMS with a job group, and a necessary value is set in the fields for the SUBMITTED_JOBS table in the DMS and for the JOB_PARMS table.

A job can be canceled for each job group, and can also be canceled for each device. When a job is canceled, a corresponding entry is removed from the database. This job deletion operation by the DMS is the only one in which an entry is deleted from the database, and a job that is currently being executed can not be deleted. Even thought the attribute of a job can be changed by altering the SUBMITTED_JOB table in the DMS.

A list of jobs can be compiled by referring to the SUBMITTED_JOB table in the DMS, the JOB_COMPLETION table, the SUBMITTED_JOB_EXT table and the JOB- _GROUP table. Then, the statuses of all the jobs belonging to a specific job group can be obtained. In this case, the jobs can be filtered using the status and the date, and a list of the job groups to which a specific job belongs can be obtained.

3-8. Management of Job Profiles

To add a job profile, an entry is made in to the JOB_PROFILE table. But before a job profile is added, associated software must be uploaded and the software information must be stored in the SOFTWARE table in the DMS. The servlet of the console manager 3 is responsible for the uploading of the software.

To delete a job profile, an entry is removed from the JOB_PROFILE table, while associated software is deleted and a corresponding entry is removed from the SOFTWARE table. However, when a job issued by a specific JOB_PROFILE is present in the database, the job profile can not be deleted.

To change an attribute for a job profile, an entry for the only alterable attribute in the JOB_PROFILE table, the job profile name, is altered. A list of job profiles can be compiled by referring to the JOB_PROFILE table and the SERVICE table.

3-9. Uploading a Job Resource

Software distributed to a device must be uploaded before a job is scheduled, and the console manager 3 must process a request from the management console to upload a job resource. A job resource is, for example, software (an image, a document, a program, etc.) to be distributed, a package definition file in which software to be distributed and a setup are written, or a package consisting of a collection of the above described software and a definition file.

As is shown in FIG. 6, a package file is prepared by the company (step 45), and in accordance with a request for the preparation of a task template (step 46), an upload directory is created for each company (step 47). Subsequently, each company can access only its own directory under the control of the console manager 3. The upload destination is, for example, the following directory.

/jobres/J001 wherein "/jobres" denotes the parent directory of all the company resource directories. The path to the directory of the company resource, including the above directory name, is set up by the console manager servlet based, for example, on the identification name obtained from the database. When multiple DMS servers are employed, "/jobres" and the following directories must be mounted in another machine in the NFS.

A package file and a resource file are uploaded from the console to the above directory (step 48), and upon the receipt of a task template commit request (step 49), the server prepares a task template (step 50) and stores it in the JOB_PROFILE table.

3-10. Processing for a Request Issued by a Device

As is shown in FIG. 7, the device issues a job inquiry to the device manager of the DMS (step 51), and the server transmits a notification of the presence/absence of a job (step 52). If there is no job, the processing is terminated. But when there is a job, the device issues a job information transmission request to the server (step 53), and upon the receipt of this request, the server transmits the job information (step 54). Thereafter, when the server receives a job start request (step 55), it issues a job start notification (step 56). Then, if a continuation request is received from the device, the server continues to execute the job until it has been completed (step 57). Subsequently, when the device receives a job end notification, it issues a completion notification (step 58), and after the device receives an acknowledgment that the completion notification has been received, the processing is terminated.

When the above described processing is performed, in accordance with the system of this embodiment, a unique service can be provided for a device administered by a company, and since the company can entrust the server management to an enterprise, a service answering to a large variety of needs can be provided at a low cost. Further, as is described above, devices managed by a general management console 9 are limited to those for which management if provided by their own company, and devices for which management is provided by other companies can not be controlled. That is, a device managed by a company can not be controlled by the console of another company. Therefore, one DMS can be shared by multiple companies. Furthermore, when an open network, such as the Internet, is employed, security is not deteriorated because the system of the invention provides for the verification not only of an enterprise ID but also of an administrator.

The present invention has been specifically explained by using the embodiment; however, the invention is not limited to this embodiment, and can be variously modified without departing from the scope of the invention. For example, in this embodiment, as management levels, the system employs three layers: a device that constitutes an end user, a management console for a company, and the supervisor management console of an enterpriser. However, additional layers can be set as management levels. For example, an enterpriser may be controlled by another, higher enterpriser, or a device managed by a company may control another device located within the range controlled by the company.

According to this specification, companies are employed as example general administrators, but other groups, such as public agencies, schools or non-profit organizations, may also be employed. The term "company", as used in this specification, includes the concept of "public agencies, schools, non-profit organizations and other such groups".

The typical effects obtained by the invention disclosed in this application are as follows. Since only a management console must be installed in a company, the company is relieved of its responsibility for providing for the complicated operation of a management server. And since the fee that an ISP may charge for providing a device management service for multiple companies can be split among the relevant companies, the expense incurred by each company can be reduced.

Further, since multiple companies can share the same device management server and database server, and can receive a service, such as the distribution of software or the setting of devices, only the respective devices that are managed are affected. Therefore, the device setting is inhibited and is not performed for devices that are managed by other companies.

Furthermore, the security between a management console and a management server is strengthened, so that the operation of a management console via an external network is possible.

The invention claimed is:

1. A network system for using a device management server to manage devices connected to a computer network, comprising:

a plurality of general management consoles connected to the computer network;

a supervisor management console accessible by the device management server;

a database, connected to the device management server, that includes enterprise data associated with each of the general management consoles and device data associated with the enterprise data for each of the devices;

a console manager for an intermediate transfer of data between at least one of the general management consoles and the supervisor management console and the database; and means for referring to the enterprise data and the device data to permit the general management consoles to offer a service for at least one of a device and an associated group of devices, wherein management data associated with each of the general management consoles is included in the database; and wherein there is further included means for, when the general management console logs in the device management server, examining an administrator using the enterprise data and the management data.

2. The network system according to claim 1, wherein profile data associated with the service is included in the database; and wherein the console manager includes means for permitting the general management consoles to register, change, schedule or delete a service and to access the profile data.

3. The network system according to claim 2, wherein job data associated with the profile data is included in the database; and wherein the network system further comprises means, when the devices are connected to the device management server, for searching for data and for requesting services associated with the device data available at the devices.

4. The network system according to claim 1, further comprising:

means for permitting the supervisor management console to access, register, change or delete at least one of device data associated with the devices, enterprise data, management data, profile data and job data.

5. A device management method, for a network system that comprises devices connected to a computer network, a device management server to manage the devices, a plurality of general management consoles connected to the computer network, a supervisor management console accessible by the device management server, a database, connected to the device management server, that includes enterprise data associated with each of the general management consoles and the device data associated with the enterprise data for each of the devices, a console manager for an intermediate transfer of data between the general management consoles or the supervisor management console and the database, the device management method comprising steps of:

the general management consoles issuing a connection request to the device management server;

the console manager obtaining information, including enterprise IDs for the general management consoles, and searching the enterprise data to verify at least some of said plurality of general management consoles as verified general management consoles; and the verified general management consoles receiving permission to offer, and offering a service to individual devices, or a group thereof, whereat device data are available that are associated with the enterprise data, which are designated by the enterprise IDs.

6. The device management method according to claim 5, wherein a profile data associated with the service is included in the database; and wherein the general management consoles that are verified are permitted to register, change, schedule or delete a service and to access the profile data.

7. The device management method according to claim 6, wherein job data associated with the profile data is included in the database; wherein there are further included the steps of:

connecting the devices to the device management server, searching for the job data, and requesting services associated with the device data available at the devices.

8. The device management method according to claim 5, wherein management data associated with each of the general management consoles is included in the database; and wherein there are further included the steps of:

at least one of said general management consoles logging in the device management server, and examining an administrator using the enterprise data and the management data.

9. The device management method according to claim 5, wherein the supervisor management console is permitted to access, register, change or delete device data associated with all the devices, enterprise data, management data, profile data or job data.

10. A system for managing devices connected to a computer network comprising:

a device management server connected to the computer network;

a supervisor management console accessible by the device management server;

a database, connected to the device management server, that includes enterprise data associated with each of a plurality of general management consoles and the device data associated with the enterprise data for each of the devices;

a console manager for an intermediate transfer of data between general management consoles connected to the computer network or the supervisor management console and the database; and means for, upon receipt of connection requests from the general consoles, referring to the enterprise data and the device data to permit the general management consoles to offer a service for the devices, or an associated group thereof.

11. The system according to claim 10, wherein a profile data associated with the service is included in the database; and wherein the console manager includes means for permitting the general management consoles to register, change, schedule or delete a service and to access the profile data.

12. The system according to claim 11, wherein job data associated with the profile data is included in the database; and wherein the network system further comprises means, when the devices are connected to the device management server, for searching for data and for requesting services associated with the device data available at the devices.

13. The system according to claim 10, wherein management data associated with each of the general management consoles is included in the database; and wherein there is further included means for, when the general management console logs in the device management. server, examining an administrator using the enterprise data and the management data.

14. The network system according to claim 10, further comprising:

means for permitting the supervisor management console to access, register, change or delete device data associated with all the devices, enterprise data, management data, profile data or job data.

15. A data processing method using a device management system that comprises a device management server to manage devices connected to a computer network, a supervisor management console accessible to the device management server, a database, connected to the device management server, that includes enterprise data associated with each of a plurality of general management consoles and the device data associated with the enterprise data for each of the devices, and a console manager for an intermediate transfer of data between the supervisor management console, or general management consoles connected to the computer network and the database, the data processing method comprising steps of:

upon receipt of connection requests from the general management consoles, the console manager obtaining information, including enterprise IDs for the general management consoles;

searching the enterprise data to verify the general management consoles; and the verified general management consoles receiving permission to offer, and offering a service to individual devices, or a group thereof, whereat device data are available that are associated with the enterprise data, which are designated by the enterprise IDs.

16. The data processing method according to claim 15, wherein a profile data associated with the service is included in the database; and wherein the general management consoles that are verified are permitted to register, change, schedule or delete a service and to access the profile data.

17. The data processing method according to claim 16, wherein job data associated with the profile data is included in the database; wherein there are further included the steps of:

connecting the devices to the device management server, searching for the job data, and providing, for the devices, services associated with the device data available at the devices.

18. The data processing method according to claim 15, wherein management data associated with each of the general management consoles is included in the database; and wherein there is further included the step of upon receipt of a connection request from each of the general management consoles, examining an administrator of the general management console using the enterprise data and the management data.

19. The data processing method according to claim 15, wherein the supervisor management console is permitted to access, register, change or delete device data associated with all the devices, enterprise data, management data, profile data or job data.

20. A computer-readable storage medium in which a program is stored that permits a computer to perform the steps of:

upon receipt of connection requests from at least one of a plurality of general management consoles connected to a computer network, obtaining information including enterprise IDs from the general management consoles;

searching the enterprise data of a database connected to the device management server to verify at least some of the general management consoles as verified general management consoles;

searching for devices, or a group thereof, whereat device data are available that are stored in the database and are associated with the enterprise data, which are designated by the enterprise IDs; and permitting the verified general management consoles to offer a service to the devices or the group thereof.

21. The storage medium according to claim 20, wherein the program permits the computer to permit the general management consoles that are verified to register, change, schedule or delete a service and to access the profile data.

22. The storage medium according to claim 21, wherein the program permits the computer to perform the steps of:

upon receipt of connection requests from the devices, connecting the devices to the device management server, searching for job data associated with the profile data, and providing, for the devices, services associated with the device data available at the devices.

* * * * *